Figures 1, 2, 3:
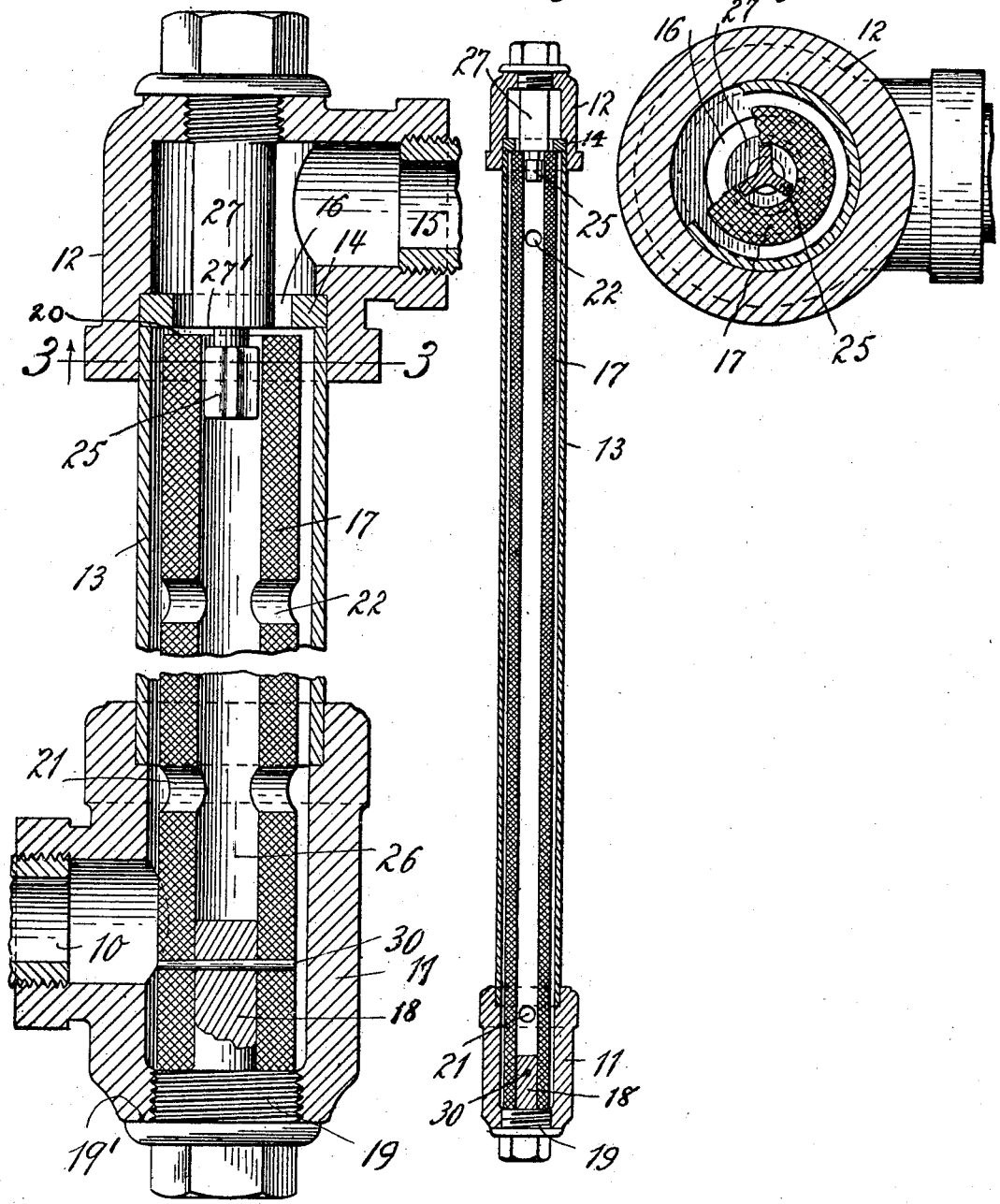

No. 795,627. PATENTED JULY 25, 1905.
H. W. LARSSON.
THERMOSTATIC VALVE.
APPLICATION FILED SEPT. 23, 1904.

Witnesses:
J. D. Garfield
M. S. Crozier

Inventor:
Henry W. Larsson,
by Wm. J. Bellman,
Attorney.

UNITED STATES PATENT OFFICE.

HENRY W. LARSSON, OF SPRINGFIELD, MASSACHUSETTS.

THERMOSTATIC VALVE.

No. 795,627.   Specification of Letters Patent.   Patented July 25, 1905.

Application filed September 23, 1904. Serial No. 225,720.

*To all whom it may concern:*

Be it known that I, HENRY W. LARSSON, a citizen of the United States of America, and a resident of Springfield, in the county of Hampden and State of Massachusetts, have invented certain new and useful Improvements in Thermostatic Valves, of which the following is a full, clear, and exact description.

This invention relates to thermostatic valves, and more especially to that class thereof in which the valve itself consists of a plug member made of hard rubber or other analogous material which will expand under the influence of heat, and thus close the opening against further supply of hot vapor, steam, or air.

My invention has for one of its objects the provision of a device of the character above described in which the valve-plug is so constructed as to afford a comparatively large supply of steam without increasing the cross-sectional area or the diameter of said plug, the latter being tubular, not only to establish a large passage for the steam, but also to render the entire plug more sensitive to the action of the heat, inasmuch as the hollow interior will naturally expose thereto a considerably greater amount of surface than can be affected when the plug is a solid one and of the same external diameter.

My invention has, furthermore, for its object the provision of means whereby the valve-plug may be rigidly held at a point remote from the valve opening or seat, so that contraction of the plug will result in positively withdrawing the active or valve end of the plug from its seat.

My invention has, furthermore, for its object the provision of means whereby the valve-plug will be centralized or maintained in such a position that when said plug expands the valve-constituting end thereof will be properly guided to its seat, and thus prevent leakage.

Further objects of my invention will be found in the particular construction and organization of the component elements of my improved device, as will be hereinafter described, and particularly pointed out in the claims.

In the accompanying drawings, in which similar characters denote similar parts, Figure 1 is a central longitudinal section of a thermostatic valve embodying my invention, the steam-passage being closed by the expanded valve-plug. Fig. 2 is a similar view showing the valve open and on an enlarged scale and taken in a plane at right angles to that shown in Fig. 1, and Fig. 3 represents a horizontal section on line 3 3 of Fig. 2.

It may be stated at this time that my improved thermostatic valve is applicable for controlling the passage of steam, hot water, or hot air and is not specifically designed for any one particular use, the device comprising a supply-pipe 10, threaded in the lower head 11, which is in communication with the upper head 12 through a conduit 13. The upper head 12 constitutes what may be termed the "valve" or "discharge" head and has a valve-seat 14, preferably in annular form and rigidly secured in place, and a pipe 15 may conduct the heated fluid or vapor to the device to be heated.

The passage 16 of the valve-seat 14 is adapted to be closed by a valve-plug 17, the lower end of which is centralized by a cylindrical projection 18 of a plug 19, which is in screw-threaded engagement with the head 11, and is consequently adapted to be adjusted vertically therein, if so desired. While the adjustment may be effected in many different ways, I deem it advantageous to screw the plug 19 into the head 11 until the upper face 19' contacts with the lower face of said head thus insuring a tight joint and preventing leakage. If it is now desired to increase the distance between the valve-seat 14 and the bearing-face 20, or, in other words, to allow for greater expansion of the valve-plug 17 before the passage 16 is closed, the valve 17 may be shortened or the plug 19 may be removed and the abutment-face 20 may be turned off or ground, as required. On the other hand, if it is desired to reduce the distance between the valve-seat 14 and the bearing-face 20 to restrict the expansion of the valve-plug 17 and to cause the passage 16 to be closed under less heat the face 19' may be dressed to permit the plug 19 to enter the head 11 for a greater distance than before. From the foregoing it will be understood that the valve-plug 17 may serve to close the passage 16 of the valve-seat at any given temperature.

In order to render the valve 17 very sensitive to the action of heat, I form the same tubular, as shown, and heat is admitted into the hollow interior of the valve through apertures 21 22, disposed near the upper and lower ends of the valve, respectively, while the latter is smaller than the interior of the conduit 13, thus leaving a space for the passage of heat exteriorly of the valve and in surface contact therewith.

Means are provided for guiding the seating end of the valve-plug 17, these means consisting, substantially, of a three-wing guide member 25, adapted to enter the tubular core 26 of the valve and formed on a plug 27, which is in screw-threaded engagement with the upper head 12, above mentioned. Inasmuch as the upper valve end is annular in form, the lower face 27' of the plug 27 is in surface alinement with the valve-seat 14, thus forming a two-part valve-seat and so that the passage 16 is also annular in form and may be properly closed by the valve-plug.

Practice has demonstrated that the proper action of the valve-plug when opening is often interfered with, the expansion of the plug being such as to cause the face thereof to adhere to the seat, and therefore my invention comprises as one of its features the provision of means whereby the contraction of the valve-plug 17 will result in positively withdrawing the valve-surface from its seat to open the passage 16. Hence I deem it expedient to hold the lower end of the plug 17 against movement, the preferred construction being illustrated in Fig. 2, in which a pin 30 serves to unite the valve 17 with the plug 19, and thus causing the expansion and contraction of the valve to have effect upon the seat end thereof only.

While I have shown and described the two-part valve-seat as located in the upper head 12 and have stated that the pipe 15 is the discharge-pipe, it will be apparent that the arrangement may be just the reverse, in which case the valve-seat would be located in the lower head 11. Likewise either the pipe 10 or the pipe 15 may constitute the inlet for the heated fluid.

Having thus described my invention, what I claim, and desire to secure by Letters Patent, is—

1. A thermostatic valve embodying in its construction, a valve-seat comprising two concentrically-arranged parts separated from each other to provide between them an annular opening, means for adjusting one of said parts longitudinally relatively to the other, and a valve-plug of expansible material having one end thereof coöperating with the two parts of the valve-seat and adapted to span the adjacent separated edges thereof to close the said annular opening.

2. A thermostatic valve, comprising a conduit, a two-part valve-seat consisting of an annular member and a concentrically-arranged plug having a shouldered portion in surface alinement with the face of the annular member, said two parts of the valve-seat being separated one from the other and forming between them an annular passage, a tubular valve-plug of expansible material having an end thereof coöperating with the valve-seat and adapted to span and close the annular opening, said tubular valve-plug having lateral openings communicating with its hollow core, and means carried by one part of the valve-seat for guiding the seat end of the valve-plug relatively to its seat.

3. A thermostatic valve comprising a conduit, an inlet-head at one end of the conduit and a discharge-head at the opposite end, a two-part valve-seat in one of said heads consisting of an annular member and a plug screwed into an opening in the wall of said head, said plug having a concentric valve-seating face arranged in surface alinement with a face of the annular member but separated from the latter whereby to provide an annular space between these two elements, a plug screwed in the opposite head, and a tubular valve of expansible material secured at one end to said plug and having its opposite end arranged to span and close the annular space between the two parts of the valve-seat.

4. A thermostatic valve, comprising an inlet-head, a discharge-head and a conduit connecting said heads, a two-part valve-seat in one of said heads consisting of an annular member and a screw-plug having a concentric valve-seating face in surface alinement with the annular member but separated therefrom to provide an annular opening between these two elements, and a tubular valve-plug of expansible material located in the conduit and having one end thereof coöperating with the two parts of the valve-seat to span and close the said annular opening.

Signed by me at Springfield, Massachusetts, in presence of two subscribing witnesses.

HENRY W. LARSSON.

Witnesses:
  Wm. S. Bellows,
  G. R. Driscoll.